(12) United States Patent
Jo et al.

(10) Patent No.: US 10,007,968 B2
(45) Date of Patent: Jun. 26, 2018

(54) IMAGE-PROCESSING CIRCUIT AND DISPLAY DEVICE HAVING THE SAME

(71) Applicant: LG DISPLAY CO., LTD., Seoul (KR)

(72) Inventors: Jung-Geun Jo, Gyeonggi-do (KR); Jung-Hyun Ham, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days. days.

(21) Appl. No.: 15/278,698

(22) Filed: Sep. 28, 2016

(65) Prior Publication Data

US 2017/0091903 A1    Mar. 30, 2017

(30) Foreign Application Priority Data

Sep. 30, 2015 (KR) .................. 10-2015-0137446

(51) Int. Cl.
*G06T 15/00* (2011.01)
*G06T 3/40* (2006.01)
*G09G 3/3233* (2016.01)
*G09G 3/20* (2006.01)
*G06T 7/13* (2017.01)

(52) U.S. Cl.
CPC ............ *G06T 3/4069* (2013.01); *G06T 3/403* (2013.01); *G06T 7/13* (2017.01); *G09G 3/2003* (2013.01); *G09G 3/3233* (2013.01); *G09G 2300/0452* (2013.01); *G09G 2340/0457* (2013.01)

(58) Field of Classification Search
CPC ......... G06T 3/4069; G06T 3/403; G06T 7/13; G09G 3/3233; G09G 2300/0452; G09G 3/2003; G09G 2340/0457
USPC .......................................................... 345/419
See application file for complete search history.

(56) References Cited

PUBLICATIONS

Mertens, Diamond Pixel: the unique GS4 sub pixel arrangement, OLED-info, Apr. 28, 2013, pp. 1-5.*
Whitwam, Pentile vs Real-Stripe AMOLED Displays: What's Different?, TESTED magazin, pp. 1-16, Feb. 2011.*

* cited by examiner

*Primary Examiner* — Phu K Nguyen
(74) *Attorney, Agent, or Firm* — Dentons US LLP

(57) ABSTRACT

Disclosed are an image-processing circuit capable of improving the ability to express a high-resolution image and a display device having the same and a method of driving a display device. The image-processing circuit determines whether input image data represents one or more of a forward diagonal line edge, a backward diagonal line edge, and a horizontal line edge, and then determines arrangement of a center unit pixel, and thereafter renders data of the center unit pixel into data of a peripheral unit pixel based on edge information and the arrangement of the center unit pixel.

10 Claims, 13 Drawing Sheets

FIG. 6A

|     | n-1 | n | n+1 |
|-----|-----|---|-----|
| m-1 | 1   | 0 | 0   |
| m   | 1   | 1 | 0   |
| m+1 | 1   | 1 | 1   |

|     | n-1 | n | n+1 |
|-----|-----|---|-----|
| m-1 | 1   | 1 | 1   |
| m   | 0   | 1 | 1   |
| m+1 | 0   | 0 | 1   |

|     | n-1 | n | n+1 |
|-----|-----|---|-----|
| m-1 | 1   | 0 | 1   |
| m   | 1   | 1 | 0   |
| m+1 | 1   | 1 | 1   |

|     | n-1 | n | n+1 |
|-----|-----|---|-----|
| m-1 | 1   | 1 | 1   |
| m   | 0   | 1 | 1   |
| m+1 | 1   | 0 | 1   |

|     | n-1 | n | n+1 |
|-----|-----|---|-----|
| m-1 | 1   | 0 | 0   |
| m   | 0   | 1 | 0   |
| m+1 | 0   | 0 | 1   |

FIG. 6B

|     | n-1 | n | n+1 |
|-----|-----|---|-----|
| m-1 | 0   | 0 | 1   |
| m   | 0   | 1 | 1   |
| m+1 | 1   | 1 | 1   |

|     | n-1 | n | n+1 |
|-----|-----|---|-----|
| m-1 | 1   | 0 | 1   |
| m   | 0   | 1 | 1   |
| m+1 | 1   | 1 | 1   |

|     | n-1 | n | n+1 |
|-----|-----|---|-----|
| m-1 | 1   | 1 | 1   |
| m   | 1   | 1 | 0   |
| m+1 | 1   | 0 | 0   |

|     | n-1 | n | n+1 |
|-----|-----|---|-----|
| m-1 | 1   | 1 | 1   |
| m   | 1   | 1 | 0   |
| m+1 | 1   | 0 | 1   |

|     | n-1 | n | n+1 |
|-----|-----|---|-----|
| m-1 | 0   | 0 | 1   |
| m   | 0   | 1 | 0   |
| m+1 | 1   | 0 | 0   |

FIG. 6C

|       | n-1 | n | n+1 |
|-------|-----|---|-----|
| m-1   | 1   | 1 | 1   |
| m     | 1   | 1 | 1   |
| m+1   | 0   | 0 | 0   |

|       | n-1 | n | n+1 |
|-------|-----|---|-----|
| m-1   | 0   | 0 | 0   |
| m     | 1   | 1 | 1   |
| m+1   | 1   | 1 | 1   |

|       | n-1 | n | n+1 |
|-------|-----|---|-----|
| m-1   | 0   | 0 | 0   |
| m     | 1   | 1 | 1   |
| m+1   | 0   | 0 | 0   |

IMAGE-PROCESSING CIRCUIT AND DISPLAY DEVICE HAVING THE SAME

This application claims the benefit of Korean Patent Application No. 2015-0137446, filed on Sep. 30, 2015, which is hereby incorporated by reference as if fully set forth herein.

BACKGROUND

Field of the Invention

The present invention relates to an image-processing circuit, which is capable of improving the ability to express a high-resolution image, and a display device having the same and a method of driving a display device.

Discussion of the Related Art

An image display device, which displays various kinds of information on a screen, is a core technology of the information and communication age, and is currently being developed with the aims of thinner and lighter design, greater portability and higher performance. Hence, flat panel display devices, which can overcome the disadvantages of heavy weight and large volume of cathode ray tubes (CRT), are in the spotlight.

A flat panel display device typically includes a plurality of unit pixels, each including red, green, and blue sub-pixels, in order to form images in various colors. The red, green, and blue sub-pixels are typically arranged in strips so that the sub-pixels having the same color are arranged in a column.

However, when the sub-pixels are arranged in strips, a black matrix, located between the respective sub-pixels, may reduce the aperture ratio and deteriorate the ability to express high-resolution images.

SUMMARY

Accordingly, the present invention is directed to an image-processing circuit and a display device having the same and a method of driving a display device that substantially obviate one or more problems due to limitations and disadvantages of the related art.

An advantage of the present invention is to provide an image-processing circuit, which is capable of improving the ability to express a high-resolution image, and a display device having the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device may, for example, include an image-processing circuit that determines whether input image data represents one or more of a forward diagonal line edge, a backward diagonal line edge, and a horizontal line edge, and then determines an arrangement of a center unit pixel, and thereafter renders data of the center unit pixel into data of a peripheral unit pixel based on edge information and the arrangement of the center unit pixel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6A to 6C are views illustrating an edge mask used in an edge information extraction unit illustrated in FIG. 4;

DETAILED DESCRIPTION OF THE ILLUSTRATED EMBODIMENTS

Reference will now be made in detail to embodiments of the present invention, examples of which are illustrated in the accompanying drawings.

Figure 1:
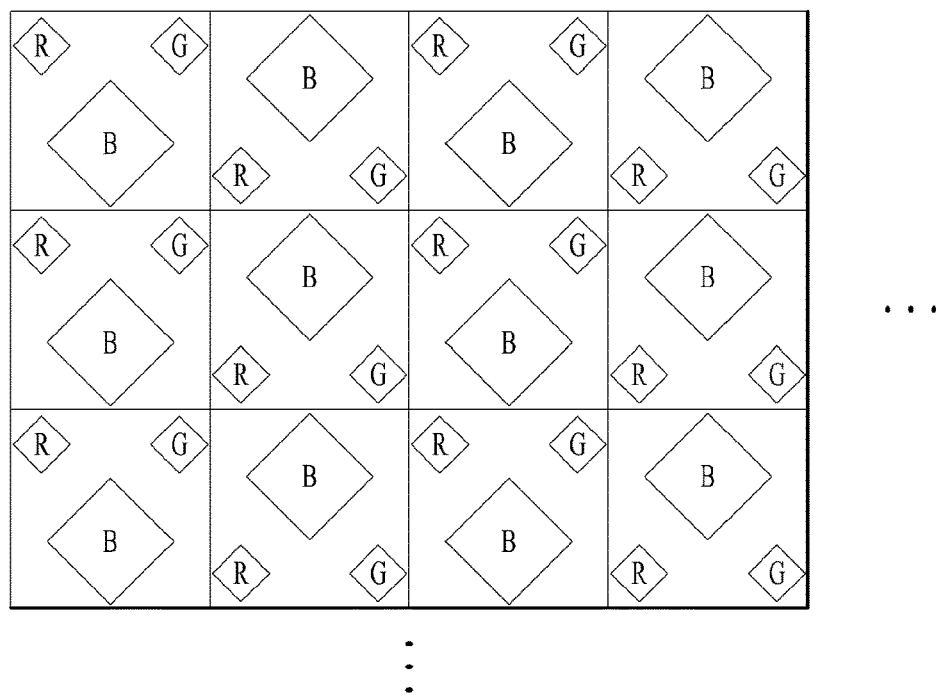
FIG. 1 is a view illustrating a display panel according to an embodiment of the present invention.

FIG. 1 is a view illustrating a display panel according to an embodiment of the present invention.

The display panel illustrated in FIG. 1 may be, for example, a liquid-crystal display panel or an organic light-emitting diode panel. An organic light-emitting diode panel will now be described by way of example.

The display panel illustrated in FIG. 1 displays an image via unit pixels PXL arranged in a matrix form. Each unit pixel PXL includes a red (R) sub-pixel, which is a first sub-pixel, a green (G) sub-pixel, which is a second sub-pixel, and a blue (B) sub-pixel, which is a third sub-pixel.

Figure 2:
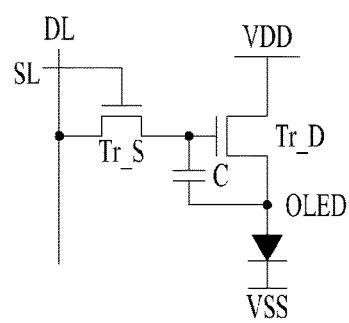
FIG. 2 is a circuit diagram illustrating a sub-pixel illustrated in FIG. 1 in detail.

Each of the red (R), green (G), and blue (B) sub-pixels includes a pixel drive circuit and an organic light-emitting diode (OLED), as illustrated in FIG. 2, in the case where the display panel is an OLED panel.

The pixel drive circuit supplies data current, which corresponds to a data signal supplied to a data line DL, to the OLED in response to a scan signal supplied to a scan line SL. To this end, the pixel drive circuit includes a switching transistor Tr_S, a driving transistor Tr_D, and a capacitor C. The switching transistor Tr_S is switched in response to the scan signal supplied to the scan line SL, thereby supplying the data signal, supplied to the data line DL, to the driving transistor Tr_D. The driving transistor Tr_D is switched in response to the data signal supplied from the switching transistor Tr_S, thereby controlling the current that flows from a high-potential power supply VDD to the OLED. The capacitor C is connected to a scan terminal of the driving transistor Tr_D and to a low-potential power supply VSS and serves to store a voltage that corresponds to the data signal supplied to the scan terminal of the driving transistor Tr_S and to keep the driving transistor Tr_D turned on with the stored voltage during one frame.

The OLED is electrically connected to a source terminal of the driving transistor Tr_D and to the low-potential power supply VSS and emits light using the current that corresponds to the data signal supplied from the driving transistor Tr_D. To this end, the OLED includes an anode connected to the source terminal of the driving transistor Tr_D, an organic layer formed on the anode, and a cathode formed on the organic layer. Here, the organic layer includes a hole-injection layer, a hole-transport layer, a light-emitting layer, an electron-transport layer, and an electron-injection layer, for example.

Accordingly, each of the red (R), green (G) and blue (B) sub-pixels of the present invention causes the light-emitting layer of the OLED to emit light by controlling the magnitude of the current that flows from the high-potential power supply VDD to the OLED using the switching of the driving transistor Tr_D based on the data signal, thereby expressing a predetermined color.

Among the red (R), green (G) and blue (B) sub-pixels, the blue (B) sub-pixel, which has the lowest efficiency, is formed to have the largest area.

In each unit pixel, the red (R), green (G) and blue (B) sub-pixels have a diamond shape. In the unit pixels arranged in each odd-numbered column, the red (R) and green (G) sub-pixels are arranged in the same odd-numbered horizontal line and the blue (B) sub-pixels are arranged in an even-numbered horizontal line. In the unit pixels arranged in each even-numbered column, the blue (B) sub-pixels are arranged in an odd-numbered horizontal line and the red (R) and green (G) sub-pixels are arranged in the same even-numbered horizontal line. That is, the unit pixels arranged in each odd-numbered column have a vertically symmetrical structure and the unit pixels arranged in each even-numbered column have a vertically symmetrical structure. As such, because the red (R), green (G), and blue (B) sub-pixels have a diamond shape, the degree of integration of pixels may be increased with the same area of pixels, which may result in increased resolution compared to a conventional stripe structure.

Figure 3:
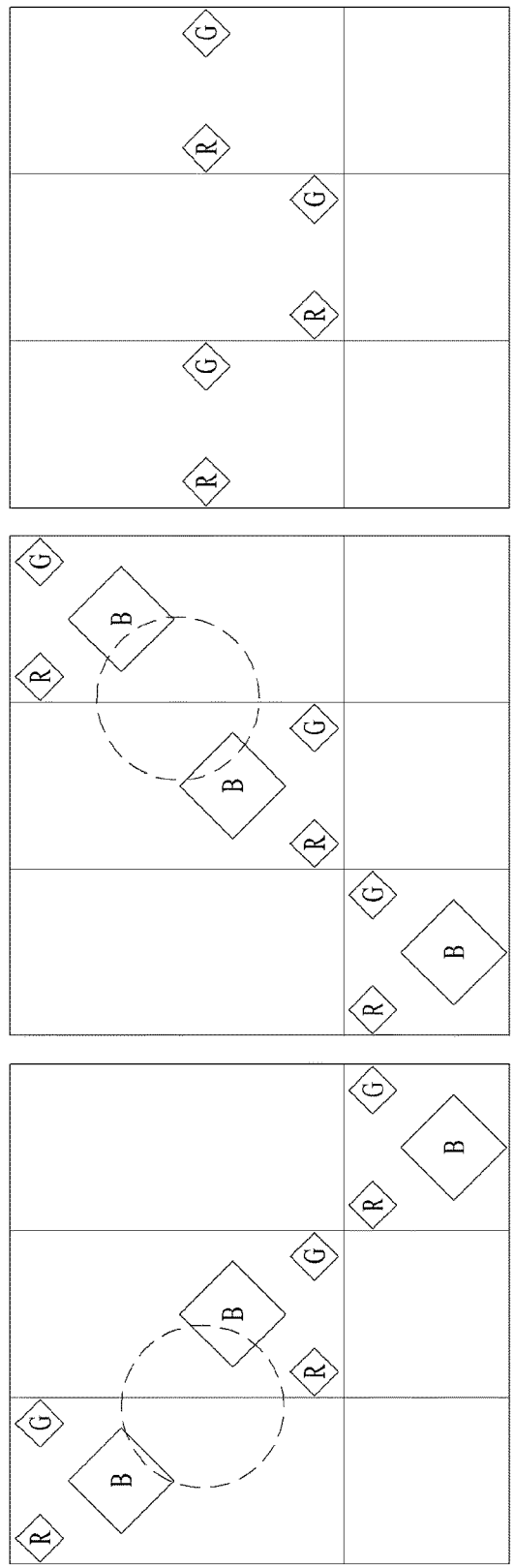
FIG. 3 is a view for explaining image-cutting that may appear in the display panel illustrated in FIG. 1.

However, in the case of expressing a diagonal line edge using the sub-pixels arranged as illustrated in FIG. 1 and FIG. 3, the ability to express a diagonal line edge is reduced because a long distance between the blue (B) sub-pixel of the odd-numbered column and the blue (B) sub-pixel of the even-numbered column. In addition, in the case of expressing a horizontal line edge, because the green (G) sub-pixel of the odd-numbered column and the red (R) sub-pixel of the even-numbered column are arranged in different horizontal lines, a zigzag line is expressed, rather than a horizontal line.

Figure 4:
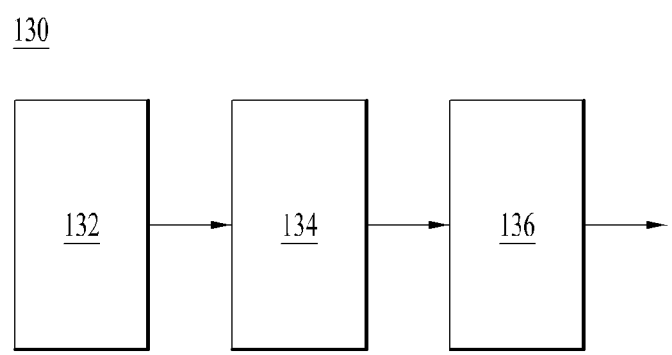
FIG. 4 is a block diagram illustrating an image-processing circuit according to an embodiment of the present invention in detail.
Figure 5:
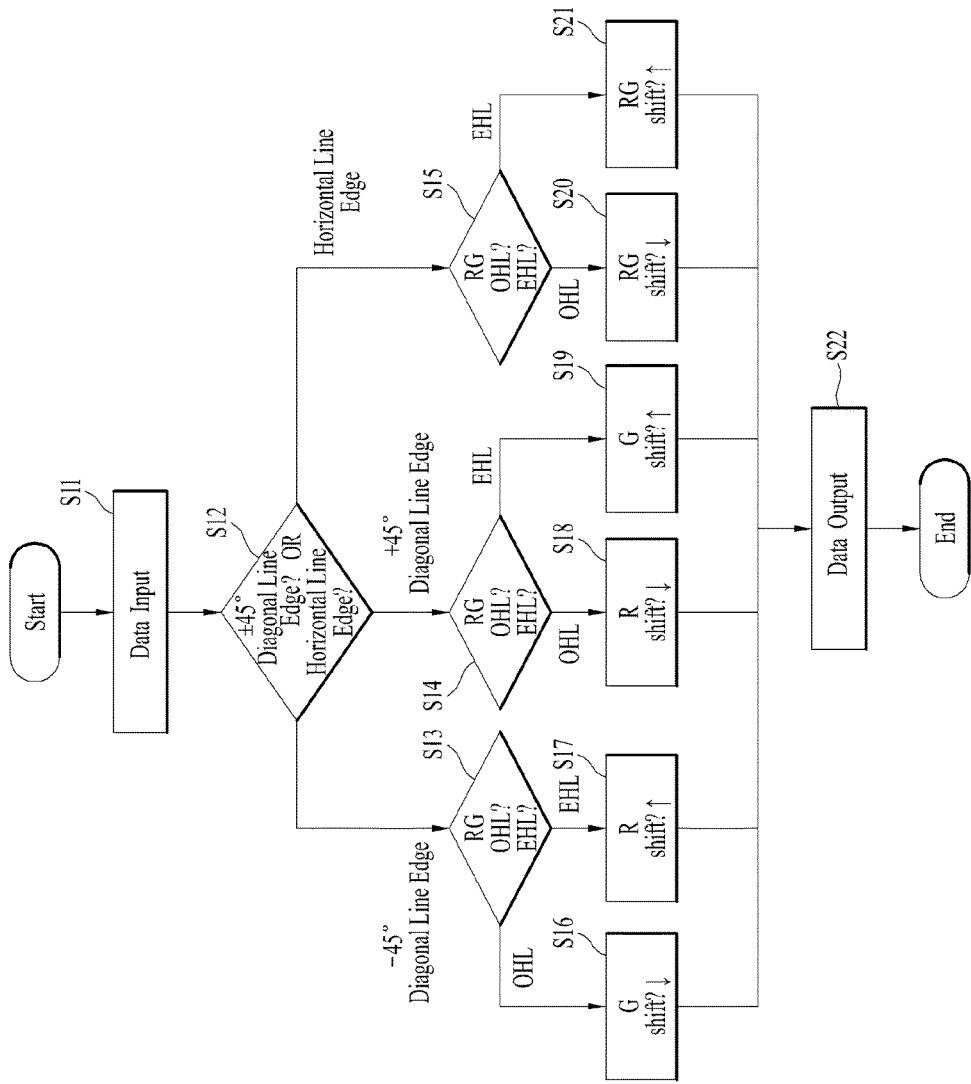
FIG. 5 is a flowchart for explaining an image-processing method using the image-processing circuit illustrated in FIG. 4.

To address the problem described above, an image-processing method illustrated in FIG. 5, which uses an image-processing circuit 130 illustrated in FIG. 4, includes detecting at least one of a diagonal line and a horizontal line in an input image, and driving neighboring sub-pixels in connection with each other depending on the direction of the detected diagonal line or horizontal line.

The image-processing circuit 130 illustrated in FIG. 4 includes an edge information extraction unit 132, a center pixel judgment unit 134, and a data rendering unit 136.

When image data is input (S11), the edge information extraction unit 132 acquires edge information of the image data by matching an edge mask of N×N cells (here, N being a natural number greater than 1) with the image data of N×N pixels (S12). That is, the edge information extraction unit 132 matches On-cells and Off-cells of the edge mask with input image data while shifting the edge mask by each pixel, thereby judging whether the input image data represents a forward (+45°) diagonal line edge, a backward (−45°) diagonal line edge, or a horizontal line edge.

For example, when an edge mask of 3×3 cells, in which On-cells having the cell value of "1" and Off-cells having the cell value of "0" are arranged, is matched with red and green data of 3×3 unit pixels as illustrated in FIG. 6A, the edge information extraction unit 132 judges that the data represents a backward diagonal line edge. That is, when the On-cells of the edge mask of 3×3 cells are matched with at least one of red and green data of unit pixels located at the coordinates of (m,n), (m+1,n+1) and (m−1,n−1) and the Off-cells of the edge mask are matched with at least one of red and green data of unit pixels located at the coordinates of (m−1,n) and (m,n+1), or at the coordinates of (m+1,n) and (m,n−1), the edge information extraction unit 132 judges that the data represents the backward diagonal line edge.

In addition, when an edge mask of 3×3 On-cells and Off-cells is matched with red and green data of 3×3 unit pixels as illustrated in FIG. 6B, the edge information extraction unit 132 judges that the data represents a forward diagonal line edge. That is, when the On-cells of the edge mask are matched with at least one of red and green data of unit pixels located at the coordinates of (m,n), (m+1,n−1) and (m−1,n+1) and the Off-cells of the edge mask are matched with at least one of red and green data of unit pixels located at the coordinates of (m−1,n) and (m,n−1), or at the coordinates of (m+1,n) and (m,n+1), the edge information extraction unit 132 judges that the data represents the forward diagonal line edge.

In addition, when an edge mask of 3×3 On-cells and Off-cells is matched with red and green data of 3×3 unit pixels as illustrated in FIG. 6c, the edge information extraction unit 132 judges that the data represents a horizontal line edge. That is, when the On-cells of the edge mask are matched with at least one of red and green data of unit pixels located at the coordinates of (m,n−1), (m,n) and (m,n+1) and the Off-cells of the edge mask are matched with at least one of red and green data of unit pixels located at the coordinates of (m−1,n−1), (m−1,n) and (m−1,n+1), or at the coordinates of (m+1,n−1), (m+1,n) and (m+1,n+1), the edge information extraction unit 132 judges that the data represents the horizontal line edge.

The center pixel judgment unit 134 judges whether red and green data of a center unit pixel, which is located at the center coordinates (m,n), among the image data of N×N unit pixels for every edge line, is data supplied to any horizontal line among even-numbered and odd-numbered horizontal lines (S13, S14 and S15).

The data rendering unit 136 shifts the data of the center unit pixel to data of a peripheral unit pixel, which is located in a row before or after the center unit pixel, depending on the shape of the line edge and the position of red and green data of the center unit pixel using a rendering mask (S16 to S21), and outputs the data to a data driver (S22). At this time, the data rendering unit 136 adds a preset first weight value (α: 0<α<1) to the data of the center unit pixel, and adds a preset second weight value (β: the sum of α and β being 1) to the data of the peripheral unit pixel, which is located in the row before or after the center unit pixel.

Figure 7A:
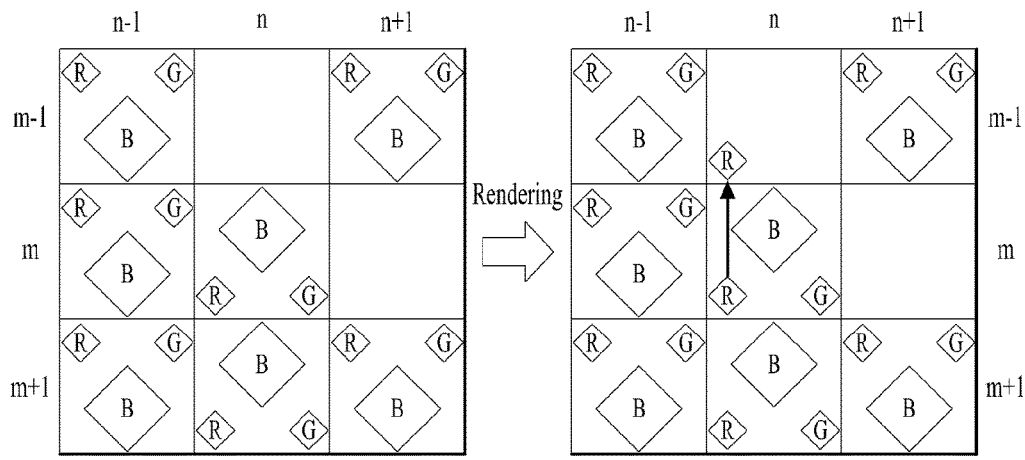
FIGS. 7A to 7D are views for explaining a data rendering operation illustrated in FIG. 5 when edge information represents a −45° diagonal line edge.
Figure 7B:
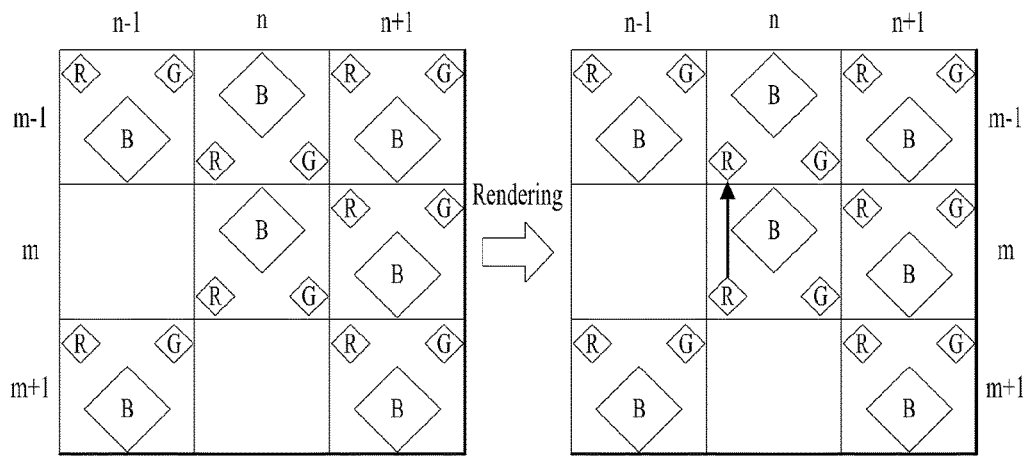

As illustrated in FIGS. 7A and 7B, when the edge of the input image is the backward diagonal line edge and the red (R) and green (G) data of the center unit pixel (m,n) is data supplied to an even-numbered horizontal line EHL, the data rendering unit 136 distributes red data of the center unit pixel (m,n) to red data of the peripheral unit pixel (m−1,n), which is located in the preceding row and in the same column as the center unit pixel (m,n), using the rendering mask (S17).

Accordingly, when the red sub-pixel of the center unit pixel (m,n) is driven and the red sub-pixel of the peripheral unit pixel (m−1,n) is not driven as illustrated in FIG. 7A, rendering the red data of the center unit pixel (m,n) into the red data of the peripheral unit pixel (m−1,n) causes both the red sub-pixels of the center and peripheral unit pixels (m,n) and (m−1,n) to be driven, which improves the ability to express the backward diagonal line edge. In addition, when the red sub-pixels of the center and peripheral unit pixels (m,n) and (m−1,n) are driven as illustrated in FIG. 7B, rendering the red data of the center unit pixel (m,n) into the red data of the peripheral unit pixel (m−1,n) causes the brightness of red light of the center unit pixel (m,n) to be reduced. This allows the diagonal line edge to be recognized as having a line shape, rather than a stepped shape, resulting in improved readability.

Figure 7C:
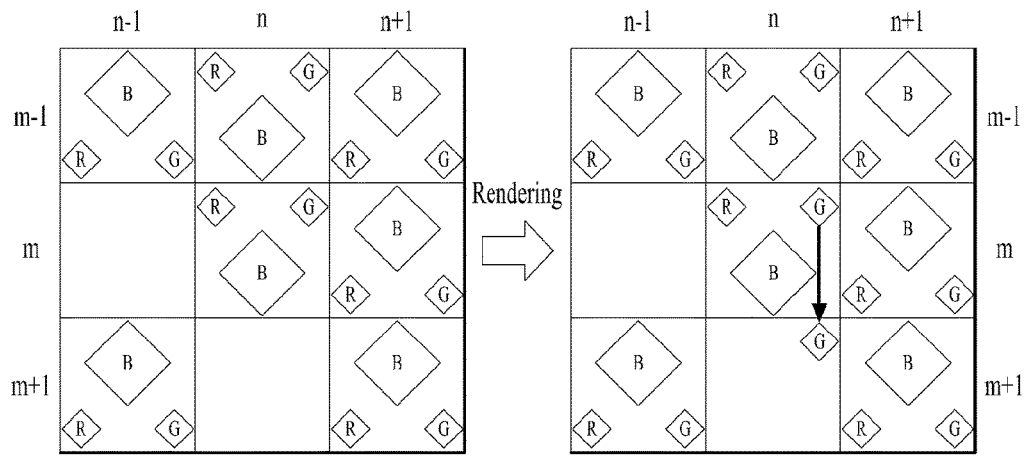
Figure 7D:
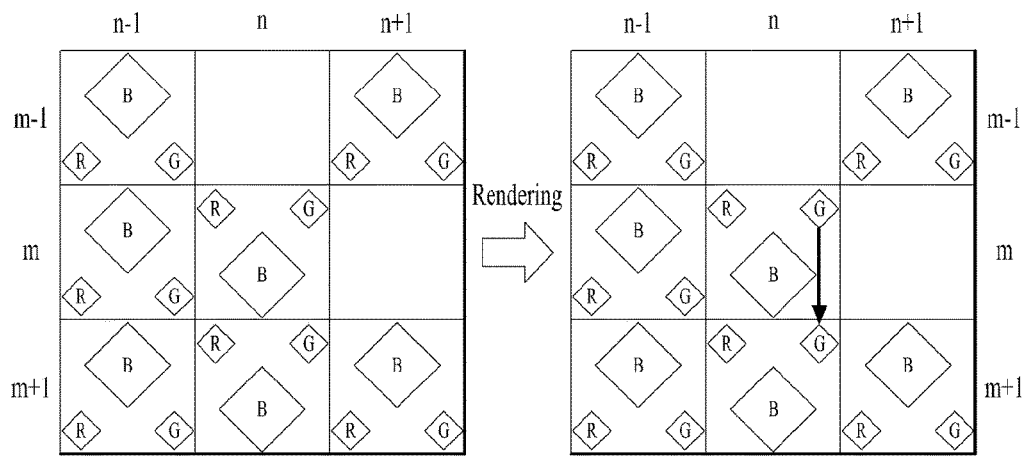

As illustrated in FIGS. 7C and 7D, when the edge of the input image is the backward diagonal line edge and the red (R) and green (G) data of the center unit pixel (m,n) is data supplied to an odd-numbered horizontal line OHL, the data rendering unit 136 distributes green data of the center unit pixel (m,n) to green data of the peripheral unit pixel (m+1, n), which is located in the same column as and in the row following that of the center unit pixel (m,n), using the rendering mask (S16).

Accordingly, when the green sub-pixel of the center unit pixel (m,n) is driven and the green sub-pixel of the peripheral unit pixel (m+1,n) is not driven as illustrated in FIG. 7C, rendering the green data of the center unit pixel (m,n) into the green data of the peripheral unit pixel (m+1,n) causes both the green sub-pixels of the center and peripheral unit pixels (m,n) and (m+1,n) to be driven, which improves the ability to express the backward diagonal line edge. In addition, when the green sub-pixels of the center and peripheral unit pixels (m,n) and (m+1,n) are driven as illustrated in FIG. 7d, rendering the green data of the center unit pixel (m,n) into the green data of the peripheral unit pixel (m+1,n) causes the brightness of green light of the center unit pixel (m,n) to be reduced. Thereby, the diagonal line edge is recognized as having a line shape, rather than a stepped shape, resulting in improved readability.

Figure 8A:
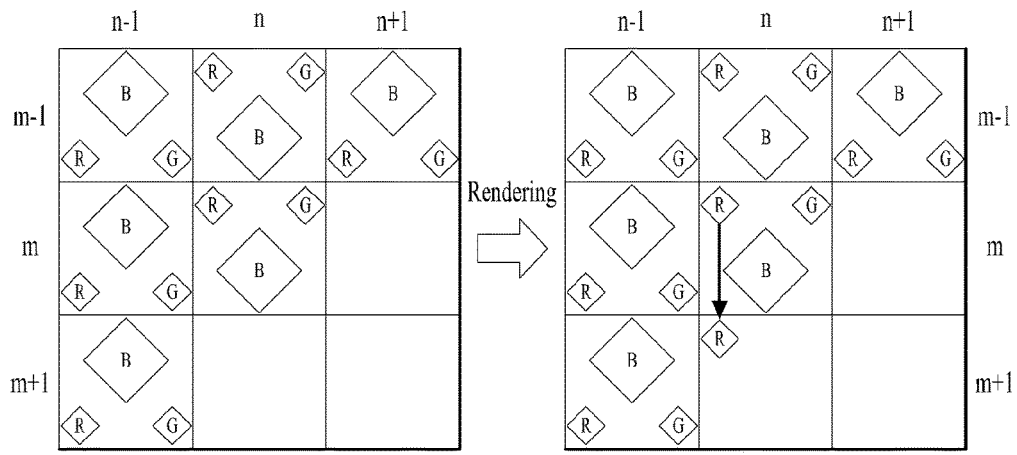
FIGS. 8A to 8D are views for explaining a data rendering operation illustrated in FIG. 5 when edge information represents a +45° diagonal line edge.
Figure 8B:
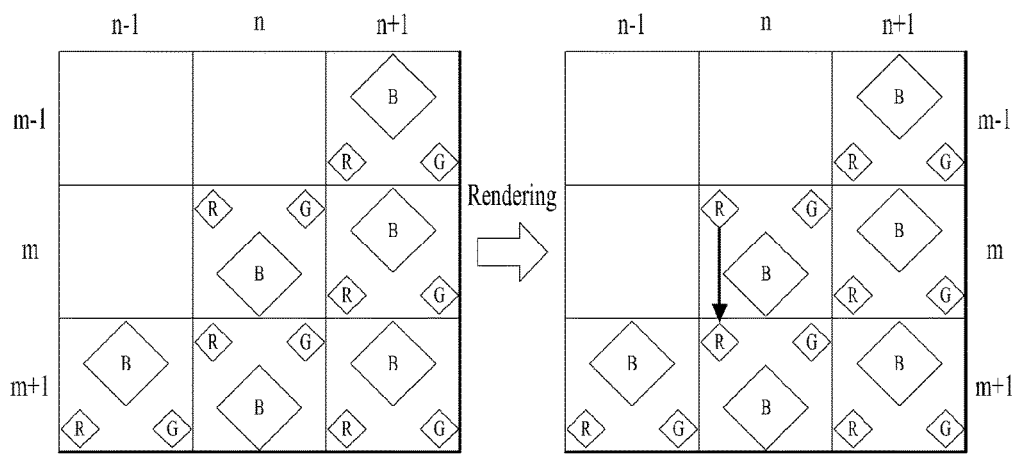

As illustrated in FIGS. 8A and 8B, when the edge of the input image is the forward diagonal line edge and the red (R) and green (G) data of the center unit pixel (m,n) is data supplied to the odd-numbered horizontal line OHL, the data rendering unit 136 distributes the red data of the center unit pixel (m,n) to the red data of the peripheral unit pixel (m+1,n), which is located in the same column as and in the row following that of the center unit pixel (m,n), using the rendering mask (S18).

Accordingly, when the red sub-pixel of the center unit pixel (m,n) is driven and the red sub-pixel of the peripheral unit pixel (m+1,n) is not driven as illustrated in FIG. 8A, the red data of the center unit pixel (m,n) is rendered into the red data of the peripheral unit pixel (m+1,n). Thereby, the red sub-pixels of the center and peripheral unit pixels (m,n) and (m+1,n) are driven, which improves the ability to express the forward diagonal line edge. In addition, when the red sub-pixels of the center and peripheral unit pixels (m,n) and (m+1,n) are driven as illustrated in FIG. 8B, rendering the red data of the center unit pixel (m,n) into the red data of the peripheral unit pixel (m+1,n) causes the brightness of red light of the center unit pixel (m,n) to be reduced. As a result, the diagonal line edge is recognized as having a line shape, rather than a stepped shape, resulting in improved readability.

Figure 8C:
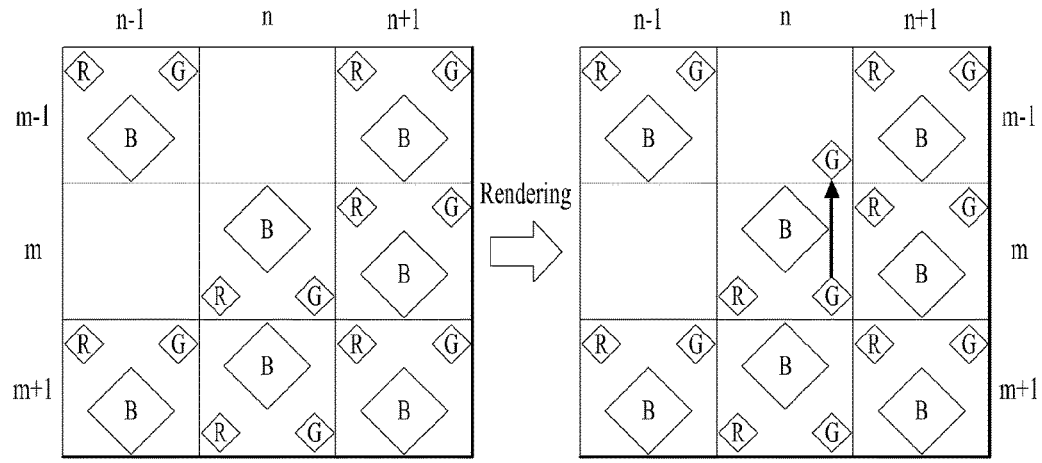
Figure 8D:
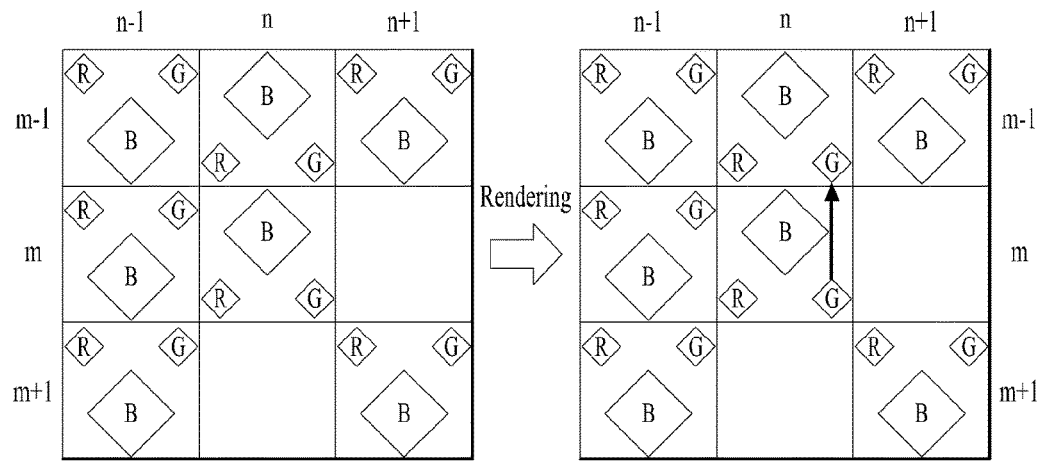

As illustrated in FIGS. 8C and 8D, when the edge of the input image is the forward diagonal line edge and the red (R) and green (G) data of the center unit pixel (m,n) is data supplied to the even-numbered horizontal line EHL, the data rendering unit 136 distributes the green data of the center unit pixel (m,n) to the green data of the peripheral unit pixel (m−1,n), which is located in the same column as and in the preceding row of the center unit pixel (m,n), using the rendering mask (S19).

Accordingly, when the green sub-pixel of the center unit pixel (m,n) is driven and the green sub-pixel of the peripheral unit pixel (m−1,n) is not driven as illustrated in FIG. 8C, the green data of the center unit pixel (m,n) is rendered into the green data of the peripheral unit pixel (m−1,n). Thereby, the green sub-pixels of the center and peripheral unit pixels (m,n) and (m−1,n) are driven, which improves the ability to express the forward diagonal line edge. In addition, when the green sub-pixels of the center and peripheral unit pixels (m,n) and (m−1,n) are driven as illustrated in FIG. 8D, rendering the green data of the center unit pixel (m,n) into the green data of the peripheral unit pixel (m−1,n) causes the brightness of green light of the center unit pixel (m,n) to be reduced. As a result, the diagonal line edge is recognized as having a line shape, rather than a stepped shape, resulting in improved readability.

Figure 9A:
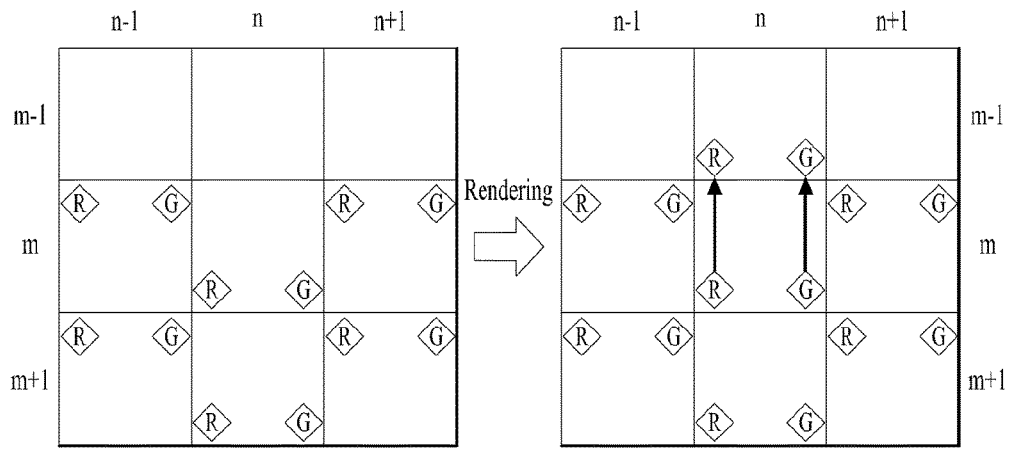
FIGS. 9A to 9D are views for explaining a data rendering operation illustrated in FIG. 5 when edge information represents a horizontal line edge.
Figure 9B:
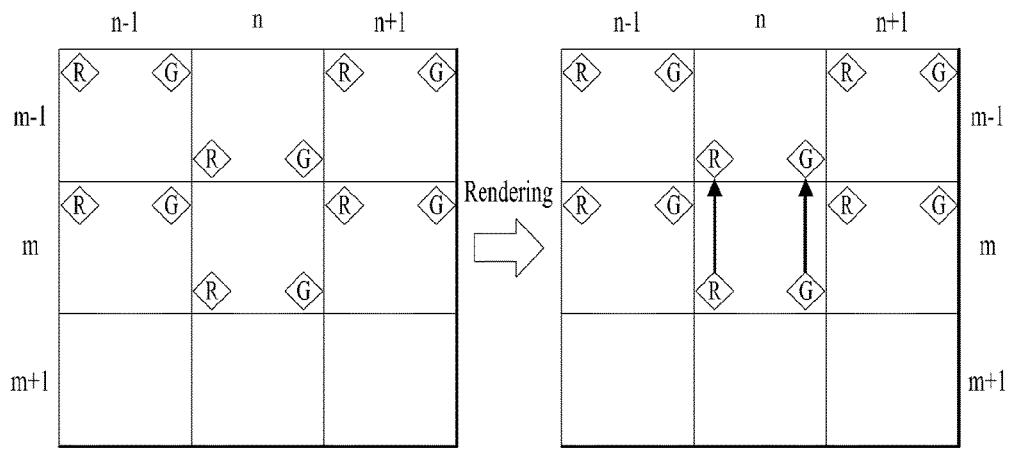

As illustrated in FIGS. 9A and 9B, when the edge of the input image is the horizontal line edge and the red (R) and green (G) data of the center unit pixel (m,n) is data supplied to the even-numbered horizontal line EHL, the data rendering unit 136 distributes the red and green data of the center unit pixel (m,n) to the red and green data of the peripheral unit pixel (m−1,n), which is located in the same column as and in the preceding row of the center unit pixel (m,n), using the rendering mask (S21).

Accordingly, when the red and green sub-pixels of the center unit pixel (m,n) are driven and the red and green sub-pixels of the peripheral unit pixel (m−1,n) are not driven as illustrated in FIG. 9A, the red and green data of the center unit pixel (m,n) is rendered into the red and green data of the peripheral unit pixel (m−1,n). As a result, the red and green sub-pixels of the center and peripheral unit pixels (m,n) and (m−1,n) are driven, which improves the ability to express the horizontal line edge. In addition, when the red and green sub-pixels of the center and peripheral unit pixels (m,n) and (m−1,n) are driven as illustrated in FIG. 9B, rendering the red and green data of the center unit pixel (m,n) into the red and green data of the peripheral unit pixel (m−1,n) causes the brightness of red and green light of the center unit pixel (m,n) to be reduced. As a result, the horizontal line edge is recognized as having a line shape, rather than a zigzag shape, resulting in improved readability.

Figure 9C:
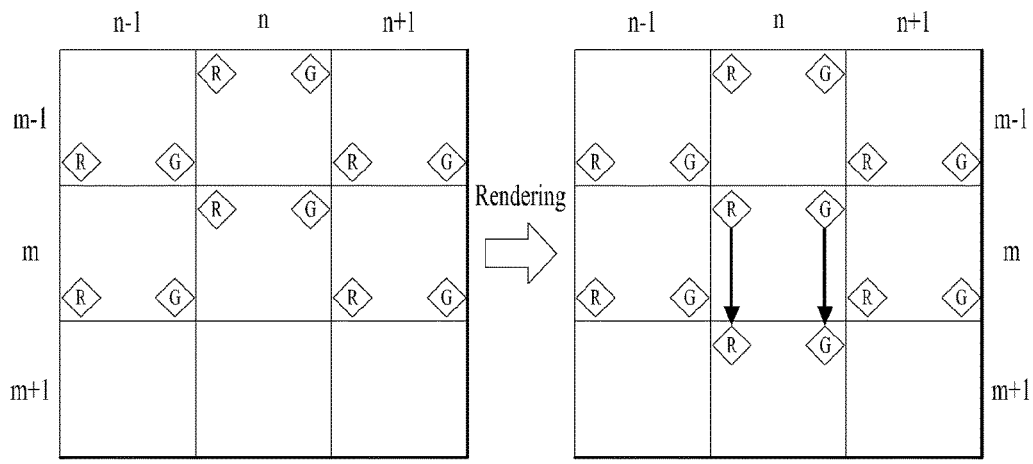
Figure 9D:
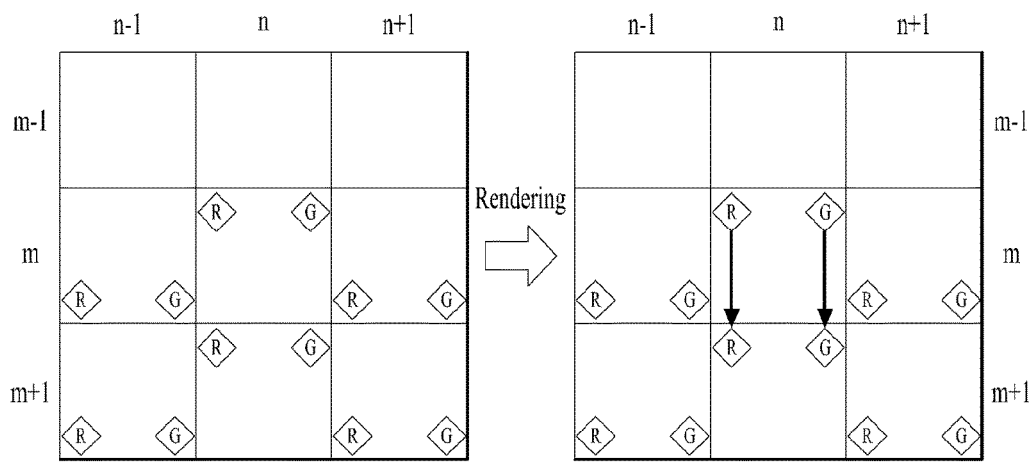

As illustrated in FIGS. 9C and 9D, when the edge of the input image is the horizontal line edge and the red (R) and green (G) data of the center unit pixel (m,n) is data supplied to the odd-numbered horizontal line OHL, the data rendering unit 136 distributes the red and green data of the center unit pixel (m,n) to the red and green data of the peripheral unit pixel (m+1,n), which is located in the same column as and in the row following that of the center unit pixel (m,n), using the rendering mask (S20).

Accordingly, when the red and green sub-pixels of the center unit pixel (m,n) are driven and the red and green sub-pixels of the peripheral unit pixel (m+1,n) are not driven as illustrated in FIG. 9C, the red and green data of the center unit pixel (m,n) is rendered into the red and green data of the peripheral unit pixel (m+1,n). As a result, the red and green sub-pixels of the center and peripheral unit pixels (m,n) and (m+1,n) are driven, which improves the ability to express the horizontal line edge. In addition, when the red and green sub-pixels of the center and peripheral unit pixels (m,n) and (m+1,n) are driven as illustrated in FIG. 9D, rendering the red and green data of the center unit pixel (m,n) into the red and green data of the peripheral unit pixel (m+1,n) causes the brightness of red and green light of the center unit pixel (m,n) to be reduced. As a result, the horizontal line edge is recognized as having a line shape, rather than a zigzag shape, resulting in improved readability.

Figure 10:
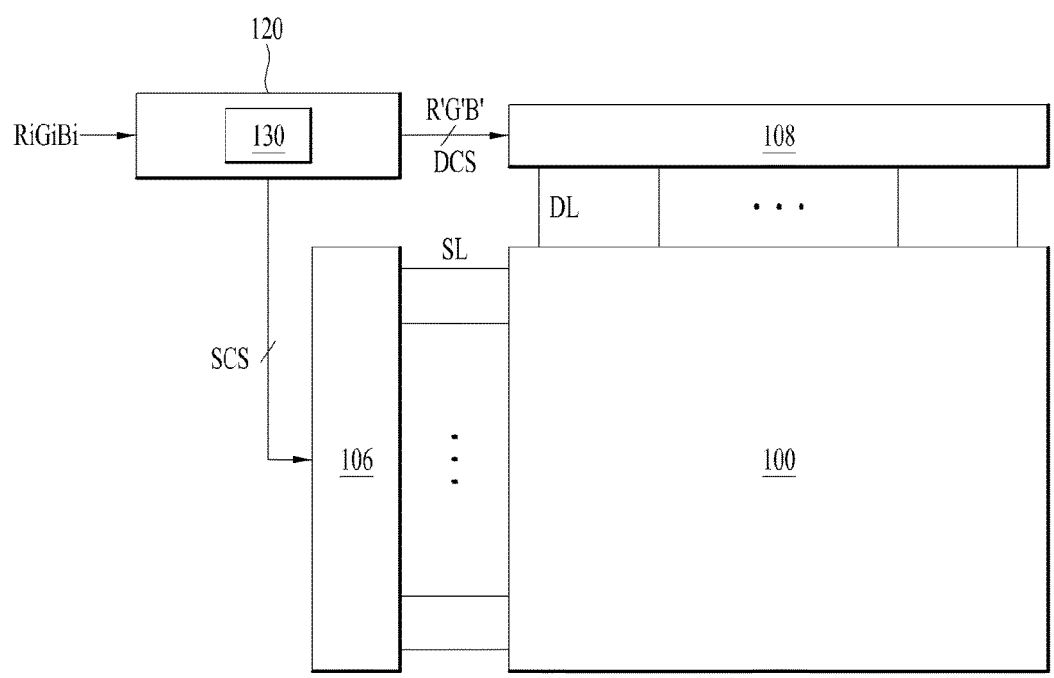
FIG. 10 is a block diagram illustrating a display device having the image-processing circuit illustrated in FIG. 4.

FIG. 10 is a block diagram illustrating a display device having the image-processing circuit 130 illustrated in FIG. 4.

As illustrated in FIG. 10, the display device includes a display panel 100, a panel drive unit including a data driver 108 and a scan driver 106 for driving the display panel 100, and a timing controller 120 for controlling the panel drive unit.

The data driver 108 converts digital data from the timing controller 120 into an analog data voltage in response to a data control signal DCS from the timing controller 120, and supplies the voltage to a data line DL whenever a corresponding scan line SL is driven.

The scan driver 106 sequentially drives the scan lines SL of the display panel 100 in response to a scan control signal SCS from the timing controller 120. The scan driver 106 supplies a high-state scan pulse during every scan period of each scan line SL, and supplies a low-state scan pulse during the remaining period for which the scan line SL is driven.

The timing controller 120 generates the data control signal DCS for controlling the driving timing of the data driver 108 and the scan control signal SCS for controlling the driving timing of the scan driver 106 using a plurality of synchronization signals input from a host computer (not illustrated), i.e. a vertical synchronization signal Vsync, a horizontal synchronization signal Hsync, a data-enable signal, and a dot clock. The timing controller 120 outputs the generated data control signal DCS and scan control signal SCS to the data driver 108 and the scan driver 106. The data control signal DCS includes, for example, a source start pulse and source sampling clock for controlling the latch of the data signal, a polarity control signal for controlling the polarity of the data signal, and a source output enable signal for controlling the output period of the data signal. The scan control signal SCS includes, for example, a scan start pulse and scan shift clock for controlling the scanning of the scan signal, and a scan output enable signal for controlling the output period of the scan signal.

The timing controller 120 performs signal-processing on image data input from the host computer and supplies the processed image data to the data driver 108. The image-processing circuit 130 mounted in the timing controller 120, as described above, judges whether the image data of N×N pixels represents at least one of a forward diagonal line edge, a backward diagonal line edge, and a horizontal line edge, and then judges the arrangement of a center unit pixel to which center data among the image data of N×N pixels is supplied, and thereafter renders data of the center unit pixel into data of a peripheral unit pixel, which is adjacent thereto on at least one of upper and lower sides, depending on the edge information and the arrangement of the center unit pixel. Accordingly, a display device according to an embodiment of the present invention achieves improvement in the readability and the ability to express the diagonal line edge and the horizontal line edge compared to the related art.

While the image-processing circuit 130 has been described as being mounted in the timing controller 120 by way of example, the image-processing circuit 130 may be located between the timing controller 120 and the data driver 108, or may be located on the input end of the timing controller 120.

As is apparent from the above description, according to an embodiment of the present invention, through the provision of red, green, and blue sub-pixels having a diamond shape, the resolution of an image may be improved. In addition, rendering data of a center unit pixel into data of a peripheral unit pixel may improve the readability and the ability to express a diagonal line edge and a horizontal line edge.

The above description is merely given to describe the present invention by way of example, and numerous modifications and embodiments can be devised by those skilled in the art that will fall within the spirit and scope of the principles of this disclosure. Accordingly, the embodiments disclosed in the specification of the present invention are not intended to limit the present invention. The scope of the present invention should be construed by the following claims, and all technologies and the invention is to cover all modifications, equivalents, and alternatives falling within the spirit and scope of the invention as defined by the claims.

What is claimed is:

1. A display device comprising:
a display panel that displays an image supplied from an image-processing circuit and a panel drive unit that drives the display panel so that the image supplied from the image-processing circuit is displayed on the display panel, wherein the image-processing circuit includes:
an edge information extraction unit that determines whether a set of image data of N×N pixels (N being an integer greater than 3) represents one or more of a forward diagonal line edge, a backward diagonal line edge, and a horizontal line edge;
a center pixel judgment unit that determines arrangement of a center unit pixel to which center data among the set of image data of N×N pixels is supplied; and
a data rendering unit that renders data of the center unit pixel into data of a peripheral unit pixel, which is adjacent thereto on at least one of upper and lower sides, depending on edge information and the arrangement of the center unit pixel.

2. The display device according to claim 1, wherein the display panel includes a plurality of unit pixels, each including red, green, and blue sub-pixels having a diamond shape, and
wherein, in each unit pixel, the red and green sub-pixels are arranged on a horizontal line that is different from a horizontal line on which the blue sub-pixel is arranged.

3. The display device according to claim 2, wherein each unit pixel that is located in an odd-numbered column of the display panel includes the red and green sub-pixels located on a first horizontal line and the blue sub-pixel located on a second horizontal line, and wherein each unit pixel that is located in an even-numbered column of the display panel includes the blue sub-pixel located on the first horizontal line and the red and green sub-pixels located on the second horizontal line.

4. The display device according to claim 1, wherein, when the edge information extraction unit judges the backward diagonal line edge and the center pixel judgment unit judges that red and green sub-pixels of the center unit pixel are located on an odd-numbered horizontal line, the data rendering unit renders green data of the center unit pixel into green data of the peripheral unit pixel that is located in a row following that of the center unit pixel, and wherein, when the edge information extraction unit judges the backward diagonal line edge and the center pixel judgment unit judges that the red and green sub-pixels of the center unit pixel are located on an even-numbered horizontal line, the data rendering unit renders red data of the center unit pixel into red data of the peripheral unit pixel that is located in a preceding row of the center unit pixel.

5. The display device according to claim 1, wherein, when the edge information extraction unit judges the forward diagonal line edge and the center pixel judgment unit judges that red and green sub-pixels of the center unit pixel are located on an odd-numbered horizontal line, the data rendering unit renders red data of the center unit pixel into red data of the peripheral unit pixel that is located in a row following that of the center unit pixel, and wherein, when the edge information extraction unit judges the forward diagonal line edge and the center pixel judgment unit judges that the red and green sub-pixels of the center unit pixel are located on an even-numbered horizontal line, the data rendering unit renders green data of the center unit pixel into green data of the peripheral unit pixel that is located in a preceding row of the center unit pixel.

6. The display device according to claim 1, wherein, when the edge information extraction unit judges the horizontal line edge and the center pixel judgment unit judges that red and green sub-pixels of the center unit pixel are located on an odd-numbered horizontal line, the data rendering unit renders red and green data of the center unit pixel into red and green data of the peripheral unit pixel that is located in a row following that of the center unit pixel, and wherein, when the edge information extraction unit judges the horizontal line edge and the center pixel judgment unit judges that the red and green sub-pixels of the center unit pixel are located on an even-numbered horizontal line, the data rendering unit renders red and green data of the center unit pixel into red and green data of the peripheral unit pixel that is located in a preceding row of the center unit pixel.

7. An image-processing circuit comprising:

an edge information extraction unit that judges whether a set of image data of N×N pixels (N being an integer greater than 3) represents one or more of a forward diagonal line edge, a backward diagonal line edge, and a horizontal line edge;

a center pixel judgment unit that judges arrangement of a center unit pixel to which center data among the set of image data of N×N pixels is supplied; and a data rendering unit that renders data of the center unit pixel into data of an adjacent peripheral unit pixel depending on edge information and the arrangement of the center unit pixel.

8. The image-processing circuit according to claim 7, wherein, when the edge information extraction unit judges the backward diagonal line edge and the center pixel judgment unit judges that red and green sub-pixels of the center unit pixel are located on an odd-numbered horizontal line, the data rendering unit renders green data of the center unit pixel into green data of the peripheral unit pixel that is located in a row following that of the center unit pixel, and wherein, when the edge information extraction unit judges the backward diagonal line edge and the center pixel judgment unit judges that the red and green sub-pixels of the center unit pixel are located on an even-numbered horizontal line, the data rendering unit renders red data of the center unit pixel into red data of the peripheral unit pixel that is located in a preceding row of the center unit pixel.

9. The image-processing circuit according to claim 7, wherein, when the edge information extraction unit judges the forward diagonal line edge and the center pixel judgment unit judges that red and green sub-pixels of the center unit pixel are located on an odd-numbered horizontal line, the data rendering unit renders red data of the center unit pixel into red data of the peripheral unit pixel that is located in a row following that of the center unit pixel, and wherein, when the edge information extraction unit judges the forward diagonal line edge and the center pixel judgment unit judges that the red and green sub-pixels of the center unit pixel are located on an even-numbered horizontal line, the data rendering unit renders green data of the center unit pixel into green data of the peripheral unit pixel that is located in a preceding row of the center unit pixel.

10. The image-processing circuit according to claim 7, wherein, when the edge information extraction unit judges the horizontal line edge and the center pixel judgment unit judges that red and green sub-pixels of the center unit pixel are located on an odd-numbered horizontal line, the data rendering unit renders red and green data of the center unit pixel into red and green data of the peripheral unit pixel that is located in a row following that of the center unit pixel, and wherein, when the edge information extraction unit judges the horizontal line edge and the center pixel judgment unit judges that the red and green sub-pixels of the center unit pixel are located on an even-numbered horizontal line, the data rendering unit renders red and green data of the center unit pixel into red and green data of the peripheral unit pixel that is located in a preceding row of the center unit pixel.

* * * * *